June 12, 1928.

J. P. FISHER 1,672,978

DISTILLATION OF LIQUID MIXTURES

Filed Oct. 7, 1922     4 Sheets-Sheet 1

June 12, 1928. 1,672,978
J. P. FISHER
DISTILLATION OF LIQUID MIXTURES
Filed Oct. 7, 1922 4 Sheets-Sheet 3

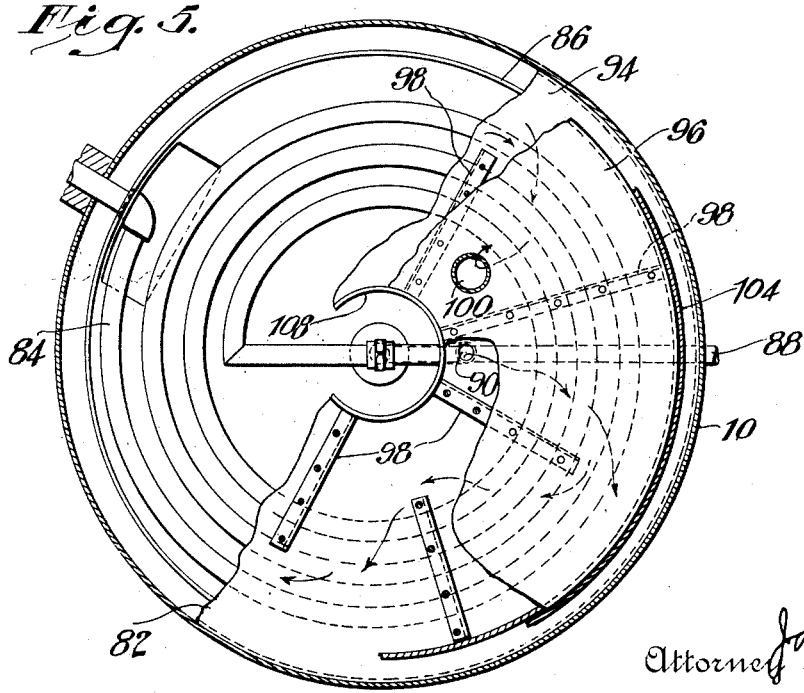

Patented June 12, 1928.

1,672,978

UNITED STATES PATENT OFFICE.

JAMES P. FISHER, OF BARTLESVILLE, OKLAHOMA, ASSIGNOR, BY MESNE ASSIGNMENTS, TO HEAT TREATING COMPANY, OF NEW YORK, N. Y., A CORPORATION OF DELAWARE.

DISTILLATION OF LIQUID MIXTURES.

Application filed October 7, 1922. Serial No. 593,101.

This invention relates to the distillation of liquid mixtures and more particularly to a process of and apparatus for fractionally distilling a petroleum oil composed of a mixture of a large number of liquid hydrocarbons.

The present invention is an improvement on the process of and apparatus for distilling oil which is illustrated and described in the application of Henry L. Doherty, Serial No. 211,537, filed January 12, 1918, patented October 30, 1923, No. 1,472,116. The fractional distilling process described in the Doherty application comprises passing oil in a continous stream through a series of different heat zones, which are maintained at progressively increasing temperatures from the point of entrance of the oil by introducing a heated gas into the highest temperature zones and passing the gas through the oil countercurrent to the flow of oil through the still. A series of vapor fractions are removed from the oil as it passes downwardly through the still, the boiling point of the fractions gradually increasing as the oil flows downwardly through the still. To obtain a sharply defined boiling point in each of the fractions the oil is maintained in bodies at different levels in the still, and the condensates or fractions are maintained in bodies at different vertical levels in the still, the oil bodies and the fractional condensate bodies being alternately arranged.

With the Doherty process a large number of vaporizing, condensing and re-vaporizing operations are carried on to separate a large number of distinct vapor fractions. Although each fraction may not in itself constitute one of the commercial products, viz., gasoline, kerosene, gas-oil, etc., several of these cuts may be combined to form the commercial product; but the large number of fractions insures that accurate initial and end points may be obtained. To maintain this alternate arrangement of oil and condensate bodies while collecting a large number of fractions requires a comparatively large and complicated apparatus.

With this in view, one object of the invention is to provide a process and apparatus for distilling oil by which a series of heat zones may be maintained in a column still, and a selective evaporation and a selective condensation may be effected in each zone.

In an oil fractionating process of the type of the present invention, the heat of evaporation of the vapors being condensed is conserved within the still, due to the condensation of the vapors by direct and indirect contact with the oil being distilled. The sensible heat of the condensates however is not recovered in the still, since the condensates are withdrawn as they are formed. It is desirable to withdraw the condensates to prevent their contamination with lighter vapor fractions which may be held in the gas or vapor circuit passing through the still, and, furthermore, any attempt to maintain the fractional condensates in the still until they have been cooled by the products within the still requires a very complicated apparatus.

Accordingly, another object of the invention is to provide a process and apparatus for distilling oil by which heat losses due to the withdrawl of condensates from the still may be provided for by waste heat gases from a still furnace.

In the apparatus shown in the drawings a column still is surrounded by a flue through which the exhaust flue products from a heater furnace pass before being discharged to the atmosphere. The hottest flue products come in contact with the highest temperature zones within the column still and the coolest exhaust flue gases are in contact with the coolest heat zones in the still.

The Doherty process utilizes a gas circuit in distilling the oil, to reduce the temperatures at which the vapor fractions may be removed from the oil, to assist in absorbing the vapors formed and carry them from the oil, and to impart the heat to the oil by forcing the heated gas directly through the oil. The gas becomes saturated with a series of different vapor fractions, and although most of the vapor fractions are condensed, a certain proportion of the lighter fractions remains in the gas. The gas passes through the oil in the still countercurrent to the flow of oil through the still, and therefore gas containing light or low boiling point fractions is introduced into the still into contact with heavy or high boiling point oil. If this gas containing the light fractions is allowed to come into contact with the low boiling point oils in a portion of the apparatus which may be cooled, the light vapors in the gas will be readily absorbed by the cooled oil. In using a gas circuit in this fractional distillation, therefore, it is difficult to prevent the contamination of the heavier vapor fractions with a small amount of light oil condensates. The presence of the light oil condensates in the heavier or high boiling distillates is very undesirable because such heavy distillates always have low initial boiling points.

Accordingly, another object of the present invention is to provide a process of fractionally distilling oil by use of a heated gas circuit by which the contamination of the various fractional distillates with light vapor condensates may be avoided.

Other objects and features of the invention consist in the improved form of construction and mode of operation of the apparatus which are illustrated in the accompanying drawings, described in the annexed specification and specifically defined in the accompanying claims.

The various features of the invention are illustrated in the accompanying drawings, in which:

Fig. 4 is a horizontal sectional view of the fractionating still taken on the line 4—4 of Fig. 2; and Fig. 5 is a horizontal sectional view of the fractionating still taken on the line 5—5 of Fig. 2.

Figure 1:
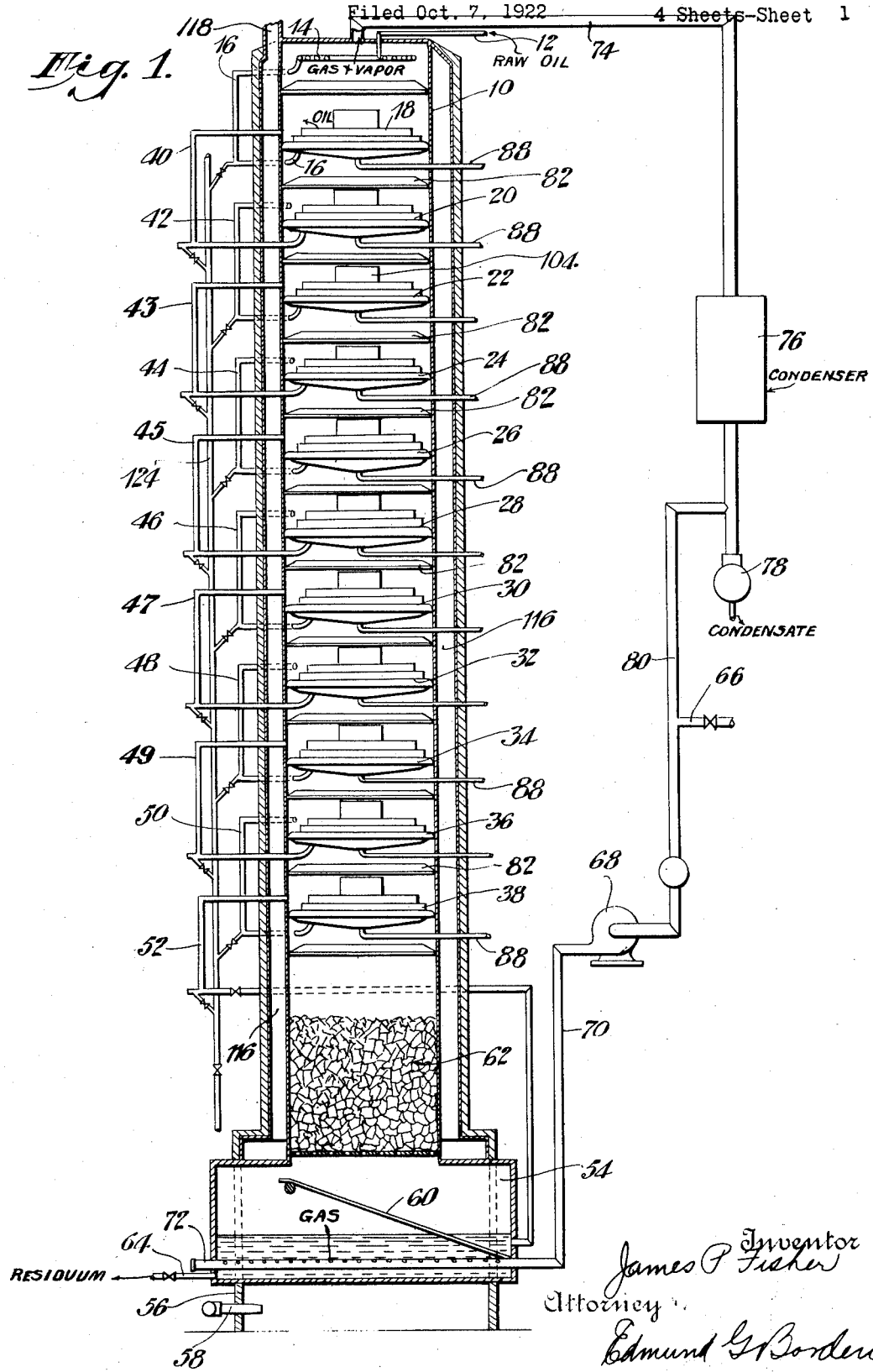
Fig. 1 is a diagrammatic view in vertical section illustrating a fractionating still embodying the preferred form of the invention.

The process embodying the preferred form of the invention may be carried out in the apparatus illustrated in the drawings substantially as follows: Oil which is preferably a crude oil consisting of a mixture of a large number of hydrocarbons having different boiling points is introduced into an upright column still 10 through a pipe 12. The oil entering the still flows through a coil 14 where it acts to condense vapors passing upwardly around the coil and then flows out through a pipe 16 and enters the bottom of an upper condensing and vaporizing compartment 18. The specific form of the still shown in the drawings comprises eleven vaporizing and condensing compartments 18 to 38 inclusive, all of which have substantially the same construction and are arranged at different vertical levels in the still. The oil from the pipe 16 flows upwardly through the compartment 18 and overflows through a pipe 40, then passes downwardly and enters the bottom of the next lower compartment 20. In like manner the oil from each of the compartments 20 to 38 inclusive overflows respectively through pipes 42 to 52 inclusive in passing downwardly through the still. From the lowermost compartment 38 the oil overflows through a pipe 52 by which it is conducted into a heater 54 mounted at the bottom of the column still and opening directly into it. The heater 54 is mounted in a furnace 56, which is arranged to be heated by a fluid fuel burner 58. In the heater 54 the vaporization of the oil is completed and the vapors pass upwardly through a screen baffle 60 into a filled dephlegmator 62 mounted in the bottom of the still. The dephlegmator 62 and baffle 60 tend to hold back the highest boiling point vapors and entrained oil, and assist in securing an accurate fractionation of the heavier vapor fractions of the oil. The oil is continually introduced at the top of the column through the pipe 12 and the residue in the heater 54 is continuously withdrawn through an outlet 64 so that the oil passes in a continuous circuit downwardly through the still.

To assist in vaporizing the oil at lower temperatures and to aid in the fractional distillation, a gas circuit is maintained through the column still. The gas which may be still gas, or fixed gases formed in the distillation, or natural gas, in introduced for starting distillation, through a pipe 66 and forced by means of a blower 68 through a pipe 70 into a distributor 72 mounted in the bottom of the heater 54. As the gas enters the oil in the heater 54 it is highly heated by bubbling through the oil, and one of the main functions of the heater is to place a sufficient amount of heat in the gas by means of the oil to effect the major portion of the vaporization of the oil passing through the column still by the heat in the gas. The baffle 60 and dephlegmator 62 also assist in holding back vapors and liquid mists which may be entrained in the gas in the heater, so that the gas circuit will not carry up the high boiling point oil fractions.

The gas passes upwardly through the condensing and vaporizing compartments in succession, and tends to vaporize an oil fraction in each compartment. The oil vapor which is formed in each compartment is carried by the gas up into the next higher compartment, and in this compartment a major portion of the vapors formed in the next lower compartment is condensed to form a distinct vapor fraction. The vapor fractions are removed from the gas as it passes upwardly through the column, so that when it reaches the top of the column substantially all of the vapors except the lightest vapors are removed from the gas. The gas leaves the top of the column through a pipe 74 and passes through a surface condenser 76 where the lightest vapor fractions are condensed. The condensed fractions are removed through a trap 78 and the gas flows from the condenser through a pipe 80 back to the blower 68 to be again circulated through the still. With this construction it will be seen that the gas is circulated in a closed cycle and becomes saturated with vapors so that after the gas has once passed through the still there will be no vapor loss due to absorption of the vapors in the gas. Any fixed or permanent gases which are formed in the still will increase the volume of gas in circulation and the excess may be withdrawn through the pipe 66.

Figure 2:
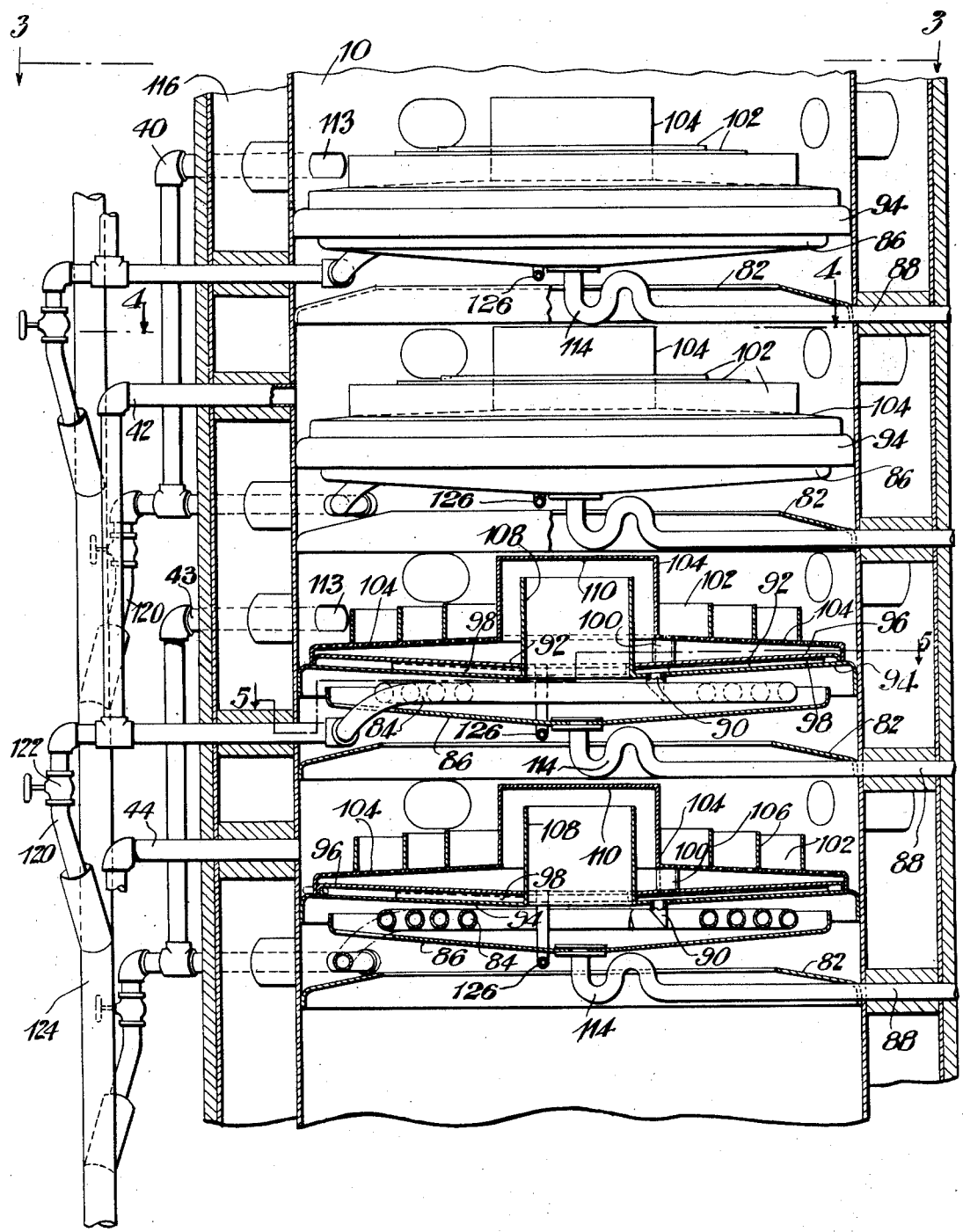
Fig. 2 is a detailed vertical sectional view of a portion of the column fractionating still.
Figure 3:
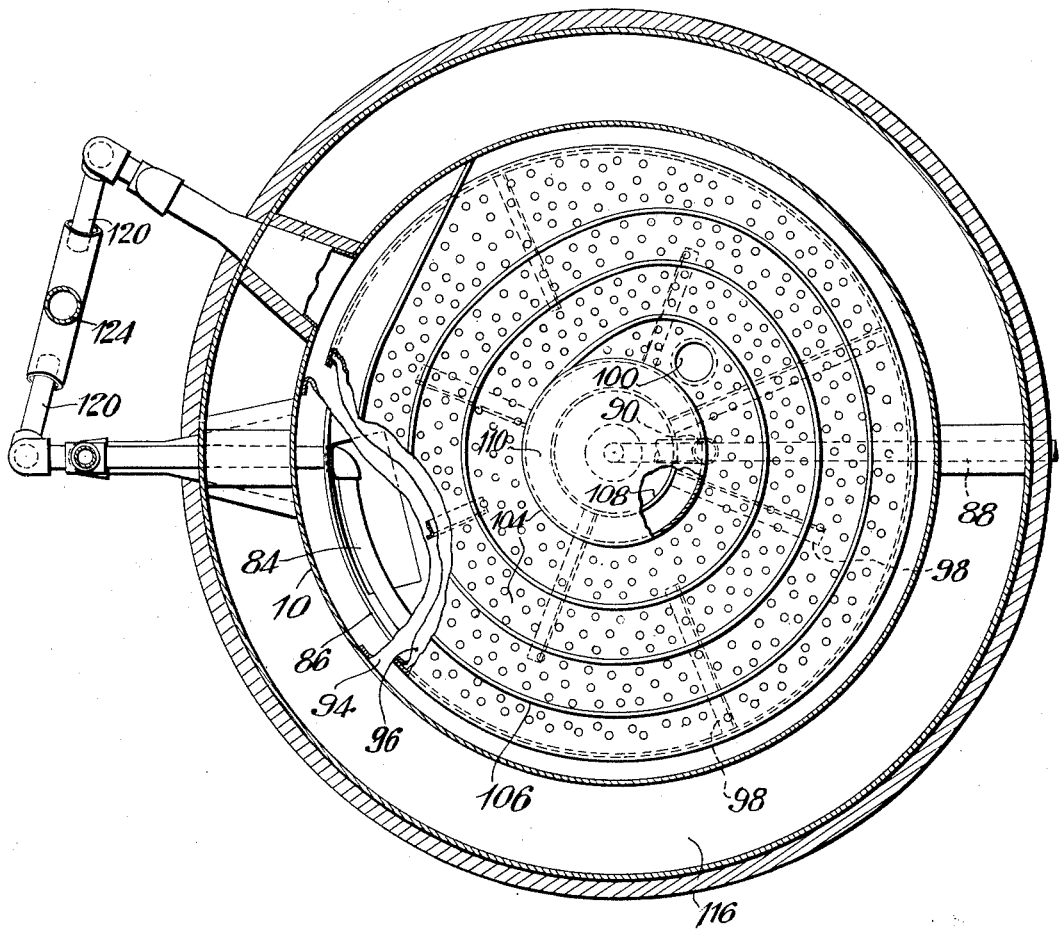
Fig. 3 is a horizontal sectional view of the fractionating still taken on the line 3—3 of Fig. 2.

The details of construction of the vaporizing and condensing compartments are shown more particularly in Figures 2, 3, 4, and 5. Each compartment comprises that portion of the still which is located between any pair of adjacent baffles 82 which are mounted in the still at different levels. In a compartment the oil first passes through condensers for the purpose of condensing fractions of the vapors passing upwardly therethrough and then this oil is spread out in a basin where it in turn is vaporized by the vapors and hot gases passing upwardly through the oil. The oil introduced into any one of the compartments comes from the next higher compartment and flows through one of the overflow pipes 40 to 50 inclusive, into a condensing coil 84, Figures 2 and 5, which is in the path of vapors rising from the next lower compartment. The vapors entering a compartment pass around one of the baffles 82, Fig. 2, and then pass around a condensate collector 86 positioned under the coil 84. Any vapors which are condensed by the coil are caught by the condensate collector 86 and are immediately withdrawn from the still through a pipe 88. It is evident that the oil in the pipe coil 84 is in diaphragm contact, that is, in heat exchange relation through the walls of the coil with the vapors passing therearound. From the coil 84 the oil passes through an inlet 90 into a condenser 92, Figures 2 and 5, which is formed between a tray 94, extending across the column and a plate 96 spaced from and resting upon the tray 94. It will be seen also that vapors passing around the condensate collector or pan 86 and over the coil 84 come into contact for the most part with the under surface of condenser 92 and are, therefore, in diaphragm contact with the oil in such condenser. The oil entering the space through the inlet 90 is forced to follow a zigzag path circumferentially around the condenser 92, (see Figures 4 and 5) by a series of baffles 98 which are mounted between the tray 94 and the plate 96. The vapors passing through a compartment flow in contact with the condenser 92 as well as the condensing coil 84, and the condensates formed by the contact of the vapors with the condenser fall in the condensate collector 86. The oil passing around the baffles 98 in the condenser 92 leaves through an outlet 100 and is introduced into a spiral trough 102 formed on the top of a bubbling cap 104, Figures 2, 3 and 4, by means of a spiral strip 106. The bubbling cap 104 is mounted above and spaced from the condenser 92 and the major portion of the cap is provided with a series of perforations arranged to cause the gas to bubble upwardly through oil flowing through the trough 102. A central circulation pipe 108 is mounted in the tray 94 and a cap 110 is formed on the bubbling cap 104, to enclose the pipe. The pipe and cap are arranged to extend to a vertical position higher than an outlet 113 leading to the overflow pipes so that the gas and vapors are caused to pass upwardly into the cap 110 and then pass downwardly through the space formed between the bubbling cap and the tray, in order to pass upwardly through a body of oil enclosed within the basin formed by the tray. The perforations in the bubbling tray are of such size that they will prevent the oil from flowing downwardly into the space between the condenser 92 and the bubbling cap while the gas and vapors are passing through this space. The unvaporized portion of the oil in a compartment which has traveled from the inner to the outer portion of the spiral trough 102 flows out of the compartment through the outlet 113 and flows down to the coil 84 of the next lower compartment.

Although the gas used in the still passes through the condenser 76 there is always a certain amount of the lighter vapors in the gas. These lighter vapors will not be condensed in the lower vaporizing and condensing compartments, which are treating the higher boiling point oils because the temperature in these compartments are too high to permit such condensation. If, however, these vapor laden gases are permitted to pass outwardly through the condensate collecting lines 88 to a point where the lines are sufficiently cool to permit some condensation, the higher boiling point condensates readily absorb the low boiling point vapors, and are therefore contaminated by the low boiling vapors which give a low initial point to the fractions. To avoid the contamination of the higher boiling point fractions a trap 114 is placed in the condensate draw-off lines to prevent the entrance of gases and vapors into the draw-off lines. This trap is preferably located within the still at the bottom of a condensate collector 86 at a point where the condensates within it will be heated to sufficiently high temperature to prevent the condensation of any low boiling point fractions in them. It is not essential, however, that the trap be located within the still, provided it is located at any point in the line where the condensates are heated to sufficiently high temperature to prevent the condensation of the low boiling point fractions therein. If pressure is required for circulating the gas through the still, any of the approved forms of pressure traps may be employed in the condensate draw-off lines.

When the vapors are condensed by contact with the coil 84 and condenser 92, the heat of evaporation of vapors is absorbed by the oil in the condensers, and therefore this heat remains within the oil in the still. The sensible heat of the condensates as they are withdrawn from the still is lost, however, and this sensible heat constitutes a considerable portion of the heat imparted to the oil. It has been found however that this heat loss may be compensated for by enclosing the column still 10 within a flue 116 which surrounds and is coextensive with the still 10. The flue 116 communicates with the furnace 56 so that the exhaust flue gases from the furnace pass upwardly between the flue and the still, and pass out through an exhaust stack 118. With this construction the highest temperature flue gases are in contact with the still adjacent the highest temperature vaporizing and condensing compartments 38, 36, 34, etc., and the lowest temperature flue gases are in contact with the still adjacent the upper compartments 18, 20, etc. By this means a heat balance may be maintained within the still to obtain a maximum capacity for distilling and to conserve the maximum amount of heat.

To provide for cleaning the still while it is in operation or at a time when the distillation operation is discontinued, waste pipes 120 (Figures 2 and 3), are connected to each of the overflow pipes 40 to 52 inclusive. These waste-pipes are provided with valves 122 and are arranged to discharge into a collecting pipe 124. The oil drawn out through the waste-pipes 120 includes only the oil which is held in the condenser 92 and coil 84. To withdraw oil which may be trapped in the basin of each compartment below the inlet pipe 100, cleanout pipes 126 opening above plate 96 are provided for such compartments. Furthermore, air or other cleaning material may be inserted through the cleanout pipes 126 to assist in cleaning the compartments.

With the construction outlined above it will be seen that oil is circulated in a continuous circuit downwardly through the still, the oil passing through a series of heat zones of progressively increasing temperatures. In each heat zone the oil is heated and vaporized, and also vapor fractions are condensed and collected. The vapors formed in one zone pass upwardly into the next zone where a major portion of them is condensed, and in condensing these vapors the oil in this compartment is heated and vaporized. This heating and vaporizing of the oil is also assisted by means of the gas circuit which circulates through the compartment and acts as a carrier for the vapors passing through the compartment. When the oil enters the uppermost compartment, it is brought into contact with the lowest temperature gas and vapors, which have a temperature sufficiently high to vaporize only the lighter or lower boiling components. Vapors of successively higher boiling points are removed from the oil as it passes downwardly through the still and there is a definite relation between the temperature of the gas and vapors and the oil, so that a vapor fraction within a definite range of boiling points is vaporized in each compartment. By this means only sufficient heat is used in each compartment which is necessary to vaporize the desired fraction, and before the higher boiling point fraction are vaporized, all of the lower boiling point components of the oil have been removed. Further, by imparting the heat to the gas and then using the gas as the heating medium for the oil in the compartments a very efficient heat transfer is carried on.

From the description given above it is evident that the vapors evolved and the gas passing from the body of oil maintained on the bubble tray of each compartment first comes in contact with the bottom of the collector 86 thereabove and therefore into heat transfer relation with the condensate therein by which a small amount of the heavier vapors are refluxed back into the body of oil below. However, the greater portion of the vapors evolved pass around the collector 86 and into heat exchange relation with oil in coils 84 and condenser 92 where the principal parts of the condensation occurs, after which the vapors and gases remaining uncondensed pass through the body of oil next above.

While the invention has been particularly described in connection with the fractional distillation of petroleum oil, it is apparent that the invention is not limited to such a distillation, but is suitable for fractionating or separating liquid mixtures.

The preferred form of the invention having been thus described, what is claimed as new is:

1. The process of fractionally distilling oils, which comprises passing oil through a distilling unit as a series of connected bodies maintained at successively higher temperatures, vaporizing oil in said bodies, and separately condensing the vapors given off from each body, except the first, by bringing them into heat interchange relation to, but out of contact with oil advancing to the next preceding body.

2. The process of distilling oil, which comprises passing the oil to be distilled through a distilling unit as a series of connected bodies maintained at progressively higher temperatures whereby vapors are evolved therefrom, condensing the vapors given off from each body, except the first, by bringing them into heat exchange relation, first with condensate previously formed, then with oil advancing to the next preceding body.

3. The process defined in claim 1 in which a heated gas is passed through said bodies of oil in counter-flow relation to the flow of oil therethrough.

4. The process defined in claim 2 in which the vapors remaining uncondensed from each body of oil is distributed into the oil in the next preceding body.

5. The process of fractionally distilling liquid mixtures which comprises continuously passing such a liquid through a series of zones of increasing temperature, heating the liquid in a confined stream during its flow from zone to zone, spreading the heated liquid over an extended surface in each zone following each heating to permit evolution of vapors therefrom and transferring the heat of vaporization of the vapors evolved in each zone, except the first, to the confined stream of liquid flowing to the next preceding cooler zone.

6. The process of fractionally distilling liquid mixtures defined in claim 5 in which a heated gas is passed through the liquid in each zone during said spreading.

7. The process defined in claim 5 in which a gas is passed through the series of zones in opposite direction to the passage of liquid therethrough.

8. A distilling apparatus comprising a column still, a series of vertically spaced units in said still, each unit comprising means for vaporizing liquids and means for condensing vapors, means for heating the lower portion of the still, a body of contact material supported in said still above said heating means and below the lowermost unit mounted in said still, means for passing liquids downwardly through said units in series and into the lower portion of said still and means whereby vapors may pass upward through said body and said units from the lower portion of said still.

9. The apparatus defined in claim 8 in which a baffle screen is mounted in said still below said body of contact material.

10. In an apparatus for refining oil, a fractionating column comprising a vertical series of cooling coils and bubble cap trays alternating one above the other in said column, means for passing oil downwardly through said cooling coils in series, a body of contact material supported in said column below the lowermost coil therein and means for supplying oil vapors to said column below the body of contact material supported therein.

11. The apparatus defined in claim 10, which includes means for maintaining the condensate produced by each coil out of contact with the vapors passing through said column.

12. An oil distilling apparatus comprising a column still, a series of oil bubbling trays mounted at different levels in the still, means for maintaining a body of oil on said trays, means to distribute vapors through said bodies of oil, a condenser below each tray, said condenser being adapted to receive oil and deliver the same to the body of oil on the tray next above, means to introduce oil at the top of the still, means to circulate oil downwardly over the trays, and means to heat the oil on the trays.

13. An oil distilling apparatus comprising a column still, a series of vaporizing and condensing compartments arranged at different vertical levels in the still, said compartments comprising an oil basin, a condenser below the basin, a pipe leading out of the basin, a condensing coil connecting said pipe with the condenser of the next lower basin, means for removing condensate formed by the condenser and the coil, means to introduce oil into the upper compartment, and means to heat oil passing through the compartments.

14. An oil distilling apparatus comprising a column still, a series of vaporizing and condensing compartments arranged at different vertical levels in the still, said compartments comprising an oil basin and condenser below the basin, a pipe leading out of the basin, a condensing coil connecting said pipe with the condenser of the next lower basin, means for removing condensate formed by the condenser and coil, means to introduce oil into the upper compartment, means for vaporizing oil passing through the compartments, and means permitting cleaning oil and residue out of each compartment.

15. An oil distilling apparatus comprising a column still, a series of vaporizing and condensing compartments arranged at different vertical levels in the still, said compartments comprising, an oil basin, a condenser below the basin, a condensing coil below the condenser and connected to the condenser, an oil pipe for conducting oil from the basin of one compartment to a coil of the next lower compartment, a condensate collector mounted below the coil and condenser, a conduit to remove condensate from the collector, means for introducing oil into the upper compartment, and means for heating oil passing through the compartments.

16. An oil distilling apparatus comprising a column still, a series of oil vaporizing and condensing compartments arranged at different vertical levels in the still, a heater connected to the bottom of the still, a furnace for the heater, a dephlegmator in the connection of the heater with the still, means to introduce gas into the heater, a passage for gas through each of said compartments, a conduit for the gas connected between the upper portion of the still and the heater, means to introduce oil into the upper compartment, and means to remove a fractional condensate from each compartment.

17. An oil distilling apparatus comprising a column still, a heating flue surrounding the still, a heater connected to the bottom of the still, a furnace for said heater, a connection between the furnace and said flue, a series of bubbling trays mounted at different levels in the still, a condensate collector mounted adjacent to each tray and arranged to hold a body of condensate out of the path of the vapors passing between said trays, and a conduit for conducting condensate from the collector out of the still.

18. An oil distilling apparatus comprising a column still, a heater connected to the bottom of the still, a furnace for said heater, a series of bubbling trays mounted at different levels in the still, a condensate collector mounted in the still adjacent each tray and arranged to hold a body of condensate out of the path of the vapors passing between said trays, and a conduit for conducting condensate from the collector out of the still.

19. An oil distilling apparatus comprising a column still, a heater at the bottom of the still, a furnace for said heater, means to introduce oil at the top of the still, means to circulate gas upwardly through the still in a closed circuit, a series of bubbling trays mounted at different levels in the still, a condensate collector mounted in the still adjacent each tray and arranged to hold a body of condensate out of the path of the vapors passing between said trays, a conduit for conducting condensate from the collector out of the still, and a trap in said conduit for preventing the entrance of gas therein.

20. An oil distilling apparatus comprising a column still, a series of oil bubbling trays mounted at different levels in the still, a heater connected to the bottom of the still, means to circulate gas through the heater into the bottom of the still and upwardly through said trays, a condensate collector mounted in the still adjacent each tray and arranged to hold a body of condensate out of the path of the vapors passing between said trays, and means for conducting the condensate from the collector out of the still.

21. An oil distilling apparatus comprising a column still, a series of bubbling trays mounted at different levels in the still, means to introduce oil at the top of the still, a reflux condenser mounted below each tray, means to conduct oil from a point above each tray to the condenser mounted below the next lower tray, means to collect condensate formed by the condenser and to hold it out of the path of the vapors passing between the trays, and means to heat oil passing through the still.

22. An oil distilling apparatus comprising a column still, a heating flue surrounding the still, a heater connected to the bottom of the still, a furnace for said heater, a connection between the furnace and the said flue, a series of bubbling trays mounted at different levels in the still, a condenser mounted below each tray, a condensate collector mounted below each condenser, said collector being adapted to hold the condensate out of the path of the vapors passing to the condenser, a conduit for removing condensate from the collector out of the still, means for conducting oil from a point above one tray to the condenser below the next lower tray, and means for introducing oil into the top of the still.

In testimony whereof I affix my signature.

JAMES P. FISHER.